No. 652,586. Patented June 26, 1900.
C. BEACH.
ROTARY ENGINE.
(Application filed Jan. 23, 1900.)
(No Model.) 4 Sheets—Sheet 1.
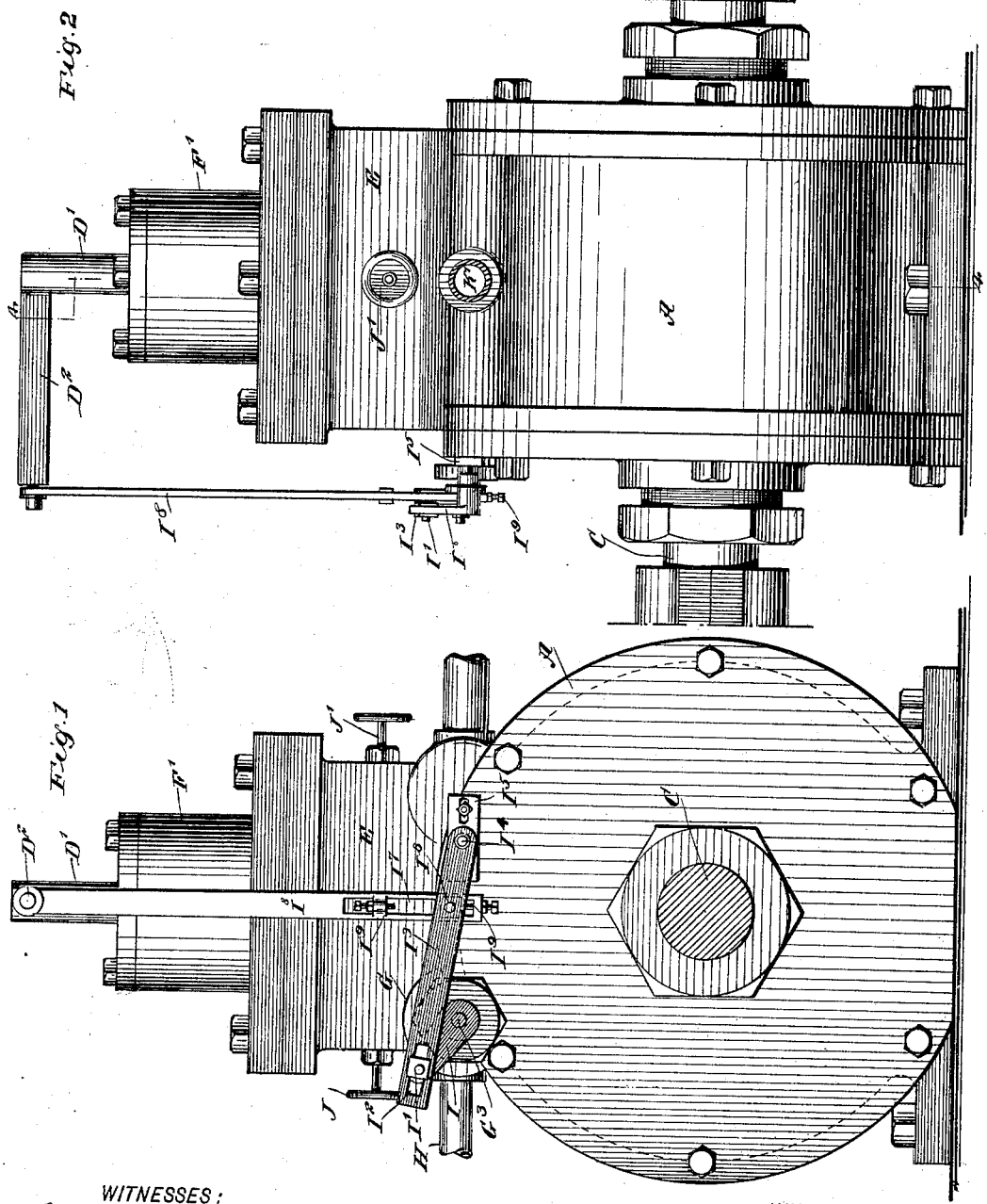
WITNESSES:
INVENTOR
Charles Beach
BY
ATTORNEYS No. 652,586. Patented June 26, 1900.
C. BEACH.
ROTARY ENGINE.
(Application filed Jan. 23, 1900.)
(No Model.) 4 Sheets—Sheet 2.
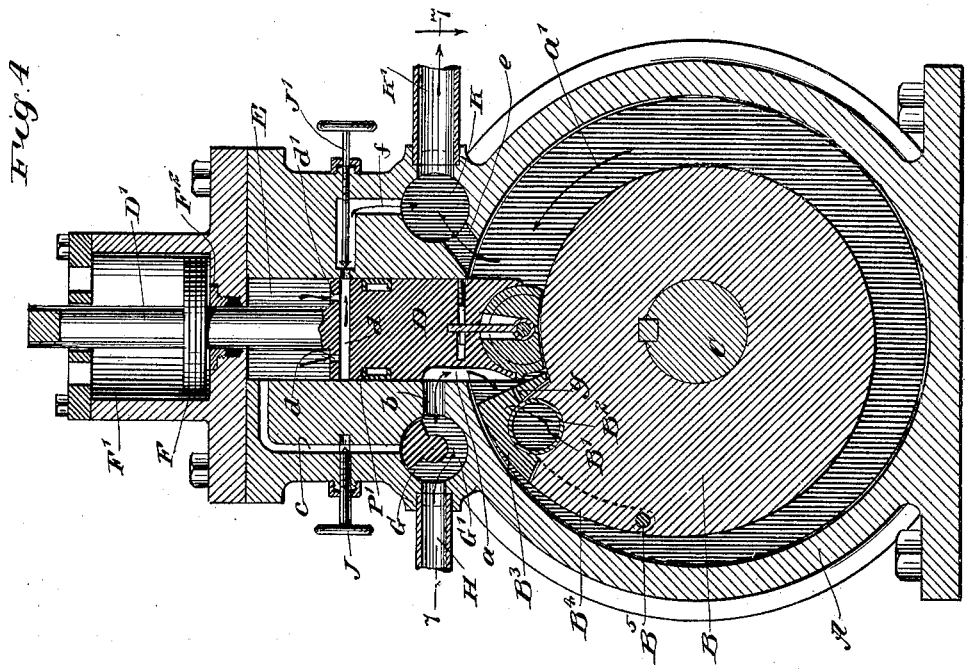
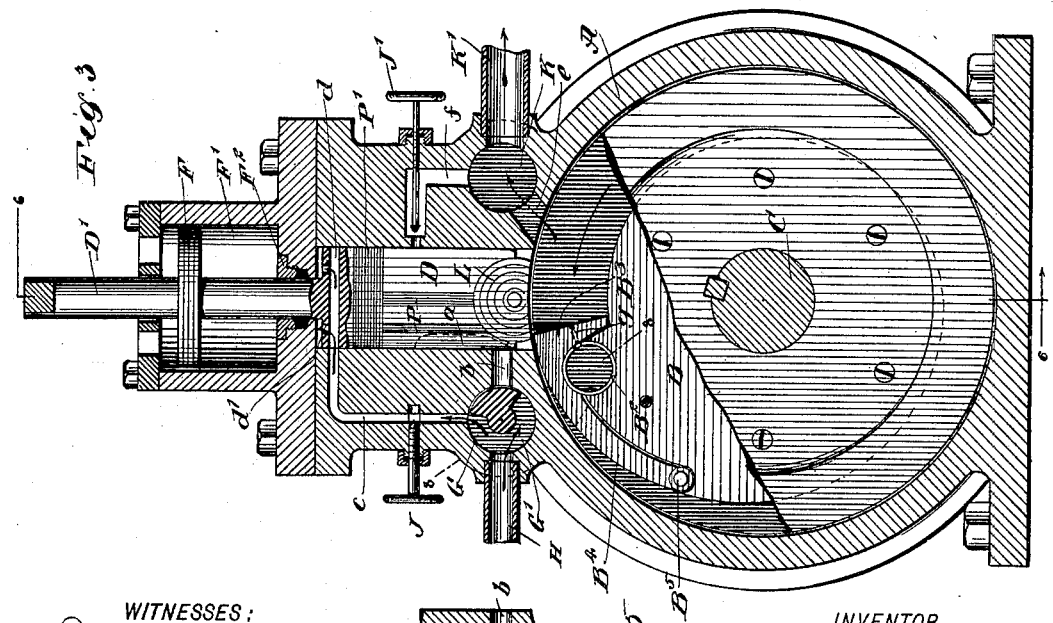
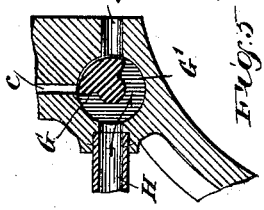
WITNESSES:
INVENTOR
Charles Beach
BY
ATTORNEYS

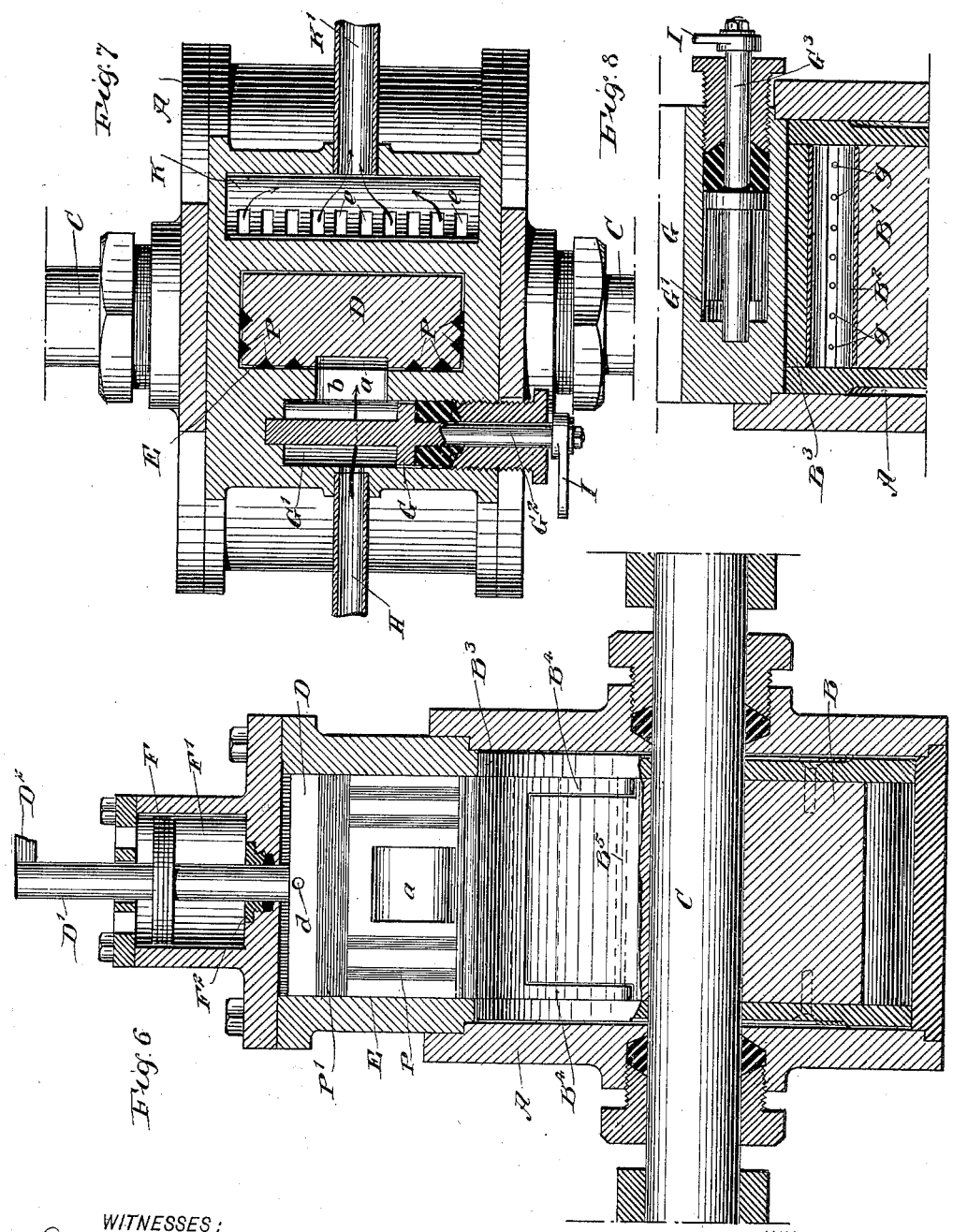

No. 652,586. Patented June 26, 1900.
C. BEACH.
ROTARY ENGINE.
(Application filed Jan. 23, 1900.)
(No Model.) 4 Sheets—Sheet 4.
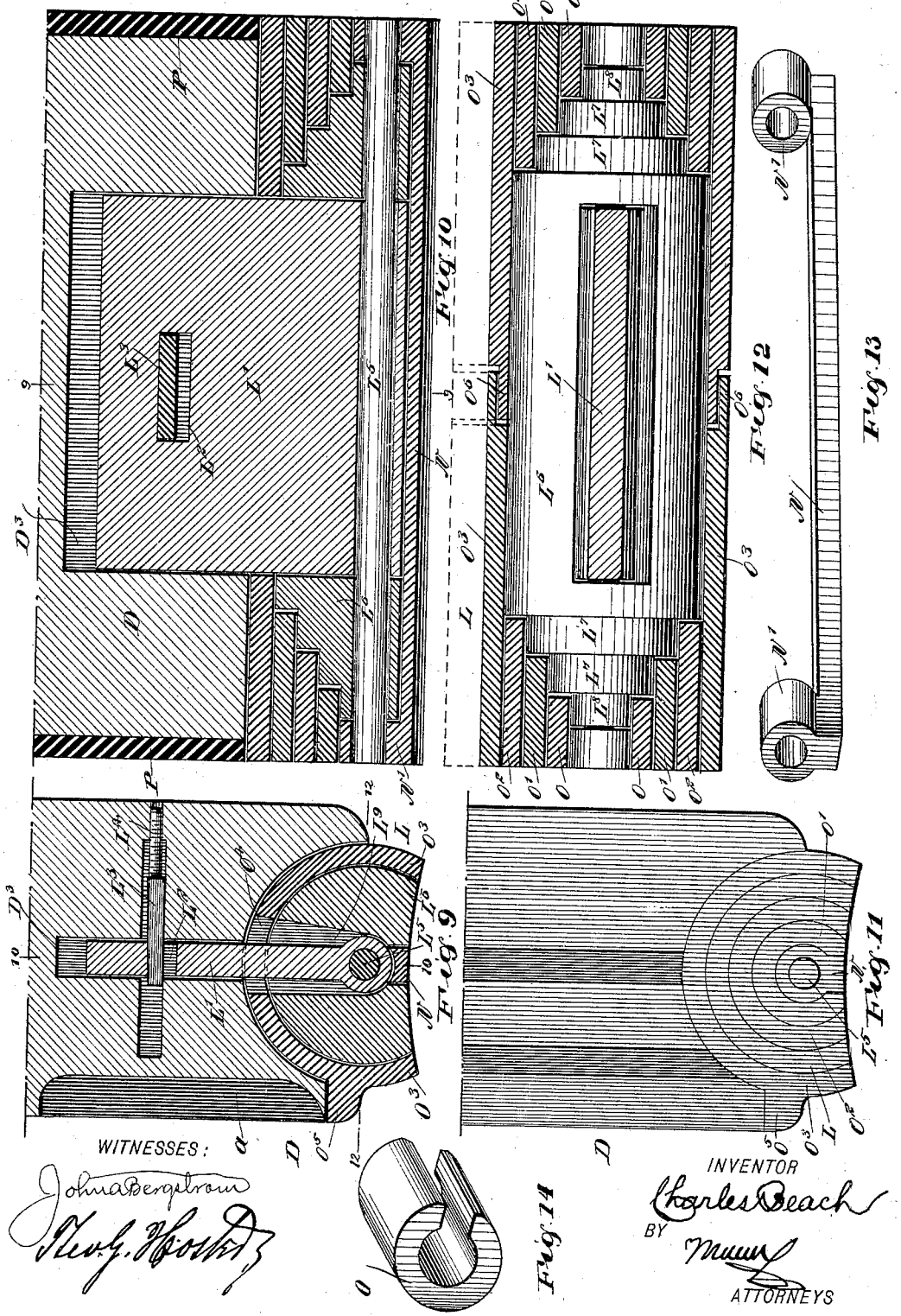

UNITED STATES PATENT OFFICE.

CHARLES BEACH, OF CATSKILL, NEW YORK.

ROTARY ENGINE.

SPECIFICATION forming part of Letters Patent No. 652,586, dated June 26, 1900.

Application filed January 23, 1900. Serial No. 2,461. (No model.)

*To all whom it may concern:*

Be it known that I, CHARLES BEACH, a citizen of the United States, and a resident of Catskill, in the county of Greene and State of New York, have invented a new and Improved Rotary Engine, of which the following is a full, clear, and exact description.

The object of the invention is to provide a new and improved rotary engine which is simple and durable in construction, very effective in operation, and arranged to prevent leakage of the motive agent, to insure great economy in its use, and to utilize the motive agent to the fullest advantage.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the views.

Figure 1 is an end elevation of the improvement. Fig. 2 is a side elevation of the same. Fig. 3 is a cross-section of the same with parts broken out. Fig. 4 is a cross-section of the same on the line 4 4 in Fig. 2. Fig. 5 is a cross-section of the inlet-valve in a different position from the one shown in Figs. 3 and 4. Fig. 6 is a sectional side elevation of the improvement on the line 6 6 in Fig. 3. Fig. 7 is a sectional plan view of the same on the line 7 7 in Fig. 4. Fig. 8 is a sectional side elevation of part of the improvement on the line 8 8 in Fig. 3. Fig. 9 is an enlarged cross-section of the inner end of the abutment, the section being taken on the line 9 9 in Fig. 10. Fig. 10 is a sectional side elevation of the same on the line 10 10 in Fig. 9. Fig. 11 is an end view of the same. Fig. 12 is a sectional plan view of the same on the line 12 12 in Fig. 9. Fig. 13 is a perspective view of the bearing for the pivot-pin of the abutment packing or facing, and Fig. 14 is a perspective view of one of the split-ring ends for the abutment-packing.

The improved rotary engine is provided with a cylinder A, in which is mounted to rotate a piston B, secured to the main driving-shaft C, journaled in suitable bearings in the heads of the cylinder A, the outer end of the shaft being provided with suitable mechanism for transmitting its rotary motion to other machinery. The peripheral surface of the piston B is made in the form of a spiral to form a piston-head B' between the beginning and the end of the spiral, and said peripheral surface is adapted to be engaged by the inner or packing end or facing of an abutment D, mounted to slide in an abutment-chamber E, formed on the cylinder A and opening into the same preferably at the top, as indicated in Figs. 3 and 4. The abutment D is provided at its upper end with a rod D', carrying a dash-pot piston F, mounted to travel in a dash-pot cylinder F', secured to the upper end of the chamber E, a stuffing-box $F^2$ being in the bottom of the cylinder for the rod D' to pass through, so that the cylinder F' and the chamber E are separated from one another.

When the abutment D is in its innermost position, as shown in Fig. 4, then the piston F is in a lowermost position in the cylinder F', and when the piston B is rotated in the direction of the arrow $a'$ then the said abutment D is moved outward, owing to the spiral periphery of the piston B, and when the piston-head B' finally passes the inner end of the said abutment then the latter is instantly forced inward by the action of the dash-pot piston F, owing to the vacuum under the said piston and the atmospheric pressure on the top of said piston F, it being understood that the upper end of the cylinder F' is connected with the atmosphere to allow air to pass into the cylinder at the top of the piston.

The motive agent for driving the piston around in the direction of the arrow $a'$ is passed into the cylinder through a channel or groove $a$, formed in the side of the abutment D, adjacent to the piston-head B', when the parts are in the position shown in Fig. 4, and this groove $a$ is adapted to connect the interior of the cylinder with a port $b$, opening into the valve-chamber G' of a rotary valve G, serving to open and close the port $b$ to allow the motive agent to pass from the chamber G' through the port $b$ and the groove $a$ into the cylinder at the time the abutment D is in an innermost position. The chamber G' is connected by a pipe H with a suitable source of motive-agent supply. The valve G also serves to control a port $c$, leading from the valve-chamber G' into the upper end of the abutment-chamber E, and the said valve is actuated in unison with the abutment D and from the latter by the following device:

On the outer end of the valve-stem $G^3$ is secured a crank-arm I, having its wrist-pin $I'$ engaging an elongated slot $I^2$, formed in an arm $I^3$, pivoted at $I^4$ to a block $I^5$, adjustably held on one of the heads of the cylinder A. (See Fig. 1.) On the arm $I^3$, between the pivot $I^4$ and the slot $I^2$, is held a block $I^6$, engaging an elongated slot $I^7$ in a link $I^8$, pivotally connected with an arm $D^2$, projecting from the upper outer end of the rod $D'$, attached to the abutment D, and also forming the piston-rod for the piston F of the dash-pot. The block $I^6$ is mounted to slide between adjusting-screws $I^9$, held on the link $I^8$ to limit the movement of the said block, it being understood that when the abutment D moves outward then the block $I^6$ rests on the lower adjusting-screw $I^9$ and is carried upward by the link $I^8$, with the rod $D'$, so that a swinging motion is imparted to the arm $I^3$, and consequently a like motion to the crank-arm I, to turn the rotary valve G in the chamber $G'$. During a sudden downstroke of the abutment D the link $I^8$ moves a distance before its upper adjusting-screw $I^9$ engages the block $I^6$ to push the latter downward and to thus impart a return or downward-swinging motion to the arm $I^3$ to swing the crank-arm I and the valve G back to their former position.

When the abutment D is in a lowermost position, as shown in Fig. 4, the port $c$ is closed by the valve G, while the port $b$ is opened so that the motive agent can pass to the interior of the cylinder between the abutment and the piston-head $B'$, so that the motive agent in exerting its pressure against the said piston-head causes the piston B to turn in the direction of the arrow $a'$. During the revolution of the piston B the abutment D is moved upward, as previously explained, and in doing so the valve G is turned to the position shown in Fig. 3 to finally close the said port $b$ and cut off the motive agent at the point to which the valve is adjusted, according to the position of the screws $I^9$. When the valve G is in the position shown in Fig. 3, then the port $c$ is uncovered and the motive agent can now pass from the chamber $G'$ through the said port into a channel $d$, from which leads small ports $d'$ into the upper end of the chamber E to allow the motive agent to assist in forcing the abutment D downward in addition to the action of the dash-pot.

A valve J, screwing in the wall of the chamber E, serves to regulate the amount of motive agent passing through the port $c$. The exhaust from the cylinder A takes place through a port $e$ on the exhaust side of the abutment D, the said port opening into an exhaust-chamber K, from which leads an exhaust-pipe $K'$, and into the said chamber opens a port $f$, controlled by a valve $J'$, similar to the valve J. The port $f$ is adapted to connect with the channel $d$ when the abutment D is in a lowermost position and the said port $c$ is closed, so that the motive agent in the chamber E can exhaust by way of the port $f$, exhaust-chamber K, and pipe $K'$ to allow a ready outward movement of the abutment D at the next revolution of the piston B.

The inner end of the abutment D is provided with a packing or facing L, arranged to readily accommodate itself to the varying curvature of the peripheral surface of the piston B to prevent leakage of the motive agent at the joint between the said packing L and the periphery of the piston. The packing or facing L is provided with a plate $L'$, extending upwardly in a recess $D^3$, formed in the abutment D, and in the upper end of the plate is arranged an aperture $D^2$, engaged by a wedge $L^3$, held to slide transversely in the abutment, a screw-rod $L^4$ engaging the said wedge $L^3$ to move the latter inward or outward by screwing the screw-rod in a like direction in the abutment D, as will be readily understood by reference to Fig. 9. By the arrangement described the plate $L'$ may be raised or lowered to bring the contacting faces of the packing in proper relation to the peripheral surface of the piston.

The lower end of the plate $L'$ carries a pivot-pin $L^5$, on which is mounted to turn a core $L^6$, formed at its ends with steps $L^7$ and a hub $L^8$, as is plainly indicated in Fig. 12, and the extreme end of the pivot-pin $L^5$ is engaged by eyes $N'$ on a filling bar or strip N, extending in the split-ring-shaped packing-section O, fitted upon the eye $N'$ and the corresponding hub $L^8$, as indicated in Fig. 12. On each section O and projecting beyond the inner end of said section is fitted another packing-section $O'$ to fit on the first step $L^7$, and on this section $O'$ is fitted another section $O^2$, projecting at its inner end beyond the section $O'$ to engage the second step $L^7$ on the core $L^6$. Around the section $O^2$, as well as the core $L^6$, is fitted an enveloping section $O^3$, and the several sections of the packing, as well as the lower edge of the strip N, are concaved, as illustrated in Figs. 9 and 11, to readily fit upon the peripheral face of the piston when the abutment D is in a lowermost position, as shown in Fig. 3. The core $L^6$ is formed with an elongated aperture $L^9$ for the ready passage of the plate $L'$, and a similar aperture $O^4$ is formed in the enveloping section $O^3$, and the latter is also provided at one side with a lug $O^5$, abutting against one side of the abutment, as shown in Figs. 9 and 11. The enveloping section $O^3$ is preferably made in two parts having their inner ends $O^6$ overlapping, as shown in Fig. 12.

By the arrangement described the several sections $O$ $O'$ $O^2$ $O^3$ of the packing are concentric and are mounted to turn upon a common axis, which also is the axis of the pivot-pin $L^5$, so that the sections are independently adjusted according to the peripheral surface of the piston B, when the latter is caused to rotate, to insure a perfect contact at all times between the packing and the said peripheral surface to prevent leakage of motive agent past the abutment to the exhaust side of the piston. By having the sections break joint at the inner ends with the steps of the core L⁶ it is evident that the motive agent is not liable to leak past the said sections, and consequently a perfect packing is obtained.

The ends of the abutment D, as well as the face adjacent to the valve G, are provided with vertical packing-strips P, (see Figs. 3, 6, and 7,) and said packing-strips P terminate at their upper ends in packing-strips P′, extending lengthwise of the abutment.

The head B′ of the piston B is provided with a longitudinally-extending split tube B², having its split registering with ports g, opening into the cylinder A between the head and the abutment, so that motive agent can pass into the tube B² and expand the same and force the packing B³ outward in contact with the inner surface of the cylinder A to properly pack the piston-head. The packing B³ is held on side arms B⁴, pivoted at B⁵ to the piston B, the said packing B³ resting on the top portion of the said split tube B², while the lower part of the latter is embedded in a corresponding seat in the piston B, and consequently when the motive agent passes into the split tube and the latter expands the said packing B³ is swung outward in firm contact with the inner surface of the cylinder. As shown, the packing B³ is extended inwardly between the outer and inner ends of the spiral peripheral surface of the piston and the ports g in the said inwardly-extending portion of said packing B³.

Having thus fully described my invention, I claim as new and desire to secure by Letters Patent—

1. A rotary engine, comprising a cylinder, a rotary piston therein, an abutment movable in the cylinder and adapted to be moved outward by the piston, a dash-pot cylinder communicating with the atmosphere through openings in its top, and a dash-pot piston in said cylinder and connected with the abutment, substantially as described.

2. A rotary engine, comprising a cylinder, a piston mounted to turn therein, an abutment-chamber on the cylinder, an abutment in the chamber and slidable in the cylinder, a valve-chamber having ports leading therefrom into the upper and lower portions of the abutment-chamber, a rotary valve in said valve-chamber and controlling the ports thereof, and means for operating the valve from the abutment, substantially as described.

3. A rotary engine, comprising a cylinder, a rotary piston therein, an abutment-chamber on the cylinder and having ports leading into it at top and bottom, a valve for controlling the motive agent to said ports, and an abutment in the chamber and adapted to project into the cylinder into contact with the piston, said abutment being provided in its side with a channel or groove at its lower end, substantially as described.

4. A rotary engine comprising a cylinder, a piston mounted to turn therein, an abutment, a dash-pot for the said abutment, and an inlet-valve for the motive agent, the valve being connected with the said dash-pot, so that the movement of the abutment controls the said valve by way of the dash-pot, substantially as shown and described.

5. In a rotary engine, the combination with a cylinder, a rotary piston therein, and an abutment slidable in the cylinders, of a dash-pot cylinder, a dash-pot piston in said cylinder and connected with the abutment, a valve for controlling the motive agent to the cylinder, and means for operating said valve from the dash-pot-piston stem, substantially as described.

6. In a rotary engine, the combination with a cylinder, a rotary piston therein, and an abutment slidable in the cylinder, of a dash-pot cylinder, a piston in the said cylinder and connected with the abutment, an oscillating valve for controlling the motive agent to the cylinder, a pivoted lever loosely connected with a wrist-pin on an arm of the valve-stem, and a link having its upper end pivotally connected with an arm on the dash-pot-piston stem, and its loose end loosely connected with the said lever, substantially as described.

7. In a rotary engine, an abutment having a packing at its inner end, the said packing being in sections mounted to turn from a common center, substantially as shown and described.

8. In a rotary engine, an abutment having a packing at its inner end, the said packing consisting of a plurality of concentric sections, substantially as shown and described.

9. In a rotary engine, an abutment having a packing at its inner end, the said packing consisting of a plurality of concentric sections mounted to turn independently of one another, substantially as shown and described.

10. A packing for the abutment of a rotary engine comprising a plurality of concentric sections mounted to turn independently one on the other, substantially as shown and described.

11. A packing for the abutment of a rotary engine, and comprising a pivot-pin carried by the abutment, and a plurality of concentric sections mounted to turn independently one on the other, the innermost section being mounted to turn on said pivot, substantially as shown and described.

12. A packing for the abutment of a rotary engine, and comprising a pivot-pin carried by the abutment, and a plurality of concentric sections mounted to turn independently one on the other, the innermost section being mounted to turn on said pivot, said sections having a concave outer face, to conform to the peripheral face of the engine-piston, substantially as shown and described.

13. A packing for the abutment of a rotary engine, and comprising a pivot-pin carried by the abutment, a plurality of concentric sections mounted to turn independently one on the other, the innermost section being mounted to turn on said pivot, and means for adjusting the said pivot, substantially as shown and described.

14. A packing for the abutment of a rotary engine, and comprising a pivot-pin carried by the abutment, a plurality of concentric sections mounted to turn independently one on the other, and a core stepped at its ends to receive the inner ends of the said sections, substantially as shown and described.

15. A packing for the abutment of a rotary engine comprising a plurality of concentric sections mounted to turn independently one on the other, the sections being of varying lengths with their inner ends being arranged in step form, substantially as shown and described.

16. A packing for an abutment, and comprising a pivot-pin, a core mounted to turn thereon and having its ends stepped, and concentric packing-sections mounted to turn independently one on the other, their inner edges fitting the steps of the said core, substantially as shown and described.

17. A packing for an abutment, and comprising a pivot-pin, a core mounted to turn thereon and having its ends stepped, concentric packing-sections mounted to turn independently one on the other, their inner edges fitting the steps of the said core, a plate carrying the said pivot-pin, and means for adjustably holding the plate in the abutment, substantially as shown and described.

18. A packing for an abutment, and comprising a pivot-pin, a core mounted to turn thereon and having its ends stepped, concentric packing-sections mounted to turn independently one on the other, their inner edges fitting the steps of the said core, and an enveloping section inclosing said core and its sections, substantially as shown and described.

19. A packing for an abutment, comprising a pivot-pin, a core mounted to turn thereon and having its ends stepped, concentric packing-sections mounted to turn independently one on the other, their inner edges fitting the steps of the said core, and an enveloping section inclosing said core and its sections, the said enveloping section being made in parts and the inner ends overlapping, substantially as shown and described.

20. A rotary engine, comprising a cylinder, a piston mounted therein, an abutment-chamber opening into the cylinder, and having ports leading into it at top and bottom, a valve for controlling said ports, and an abutment in the said chamber and having a longitudinal channel at its lower end and a transverse channel at its upper end, said transverse channel being adapted to connect with an exhaust-port, substantially as described.

21. A rotary engine, comprising a cylinder, a piston therein, an abutment-chamber having ports leading into, one at the lower end and the other at the upper end, a valve for controlling said ports, an abutment in the said chamber and having a longitudinal channel at its lower end and a transverse channel at its upper end, an exhaust-chamber having ports, one leading into the cylinder and the other into the abutment-chamber and with which the transverse chamber of the abutment is adapted to connect, substantially as described.

22. In a rotary engine a piston provided with an abutting or piston head having an expanding tube, and a hinged packing-section engaging said tube, substantially as shown and described.

23. In a rotary engine a piston provided with an abutting or piston head having an expanding tube, a hinged packing-section engaging said tube, and means for allowing the motive agent to pass into the tube to expand the same, substantially as shown and described.

24. In a rotary engine a piston, provided with an abutting or piston head having an expanding tube, a hinged packing-section engaging said tube, and means for allowing the motive agent to pass into the tube to expand the same, the tube being split for the purpose, and the split registering with ports opening into the cylinder for the passage of the motive agent into the split tube, substantially as shown and described.

In testimony whereof I have signed my name to this specification in the presence of two subscribing witnesses.

CHARLES BEACH.

Witnesses:
CHARLES HOPKINS VAN ORDEN,
HOMER CORNELL GREENE.